US010547505B2

(12) United States Patent
Morper

(10) Patent No.: US 10,547,505 B2
(45) Date of Patent: Jan. 28, 2020

(54) SOFTWARE DEFINED NETWORKING FOR EDGE NODES

(71) Applicant: NOKIA SOLUTIONS AND NETWORKS OY, Espoo (FI)

(72) Inventor: Hans-Jochen Morper, Erdweg (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 790 days.

(21) Appl. No.: 14/771,539

(22) PCT Filed: Mar. 1, 2013

(86) PCT No.: PCT/EP2013/054116
§ 371 (c)(1),
(2) Date: Aug. 31, 2015

(87) PCT Pub. No.: WO2014/131462
PCT Pub. Date: Sep. 4, 2014

(65) Prior Publication Data
US 2016/0020946 A1 Jan. 21, 2016

(51) Int. Cl.
*H04L 12/24* (2006.01)
*G06F 9/06* (2006.01)
(Continued)

(52) U.S. Cl.
CPC ............ *H04L 41/0806* (2013.01); *G06F 9/06* (2013.01); *H04L 41/0803* (2013.01);
(Continued)

(58) Field of Classification Search
CPC ............ G06F 9/06; G05B 2219/31234; H04L 41/0803; H04L 41/0806; H04L 41/5054;
(Continued)

(56) References Cited

U.S. PATENT DOCUMENTS 8,224,931 B1 * 7/2012 Brandwine ......... H04L 41/5051
709/220
8,830,835 B2 * 9/2014 Casado .................. H04L 12/66
370/235
(Continued)

FOREIGN PATENT DOCUMENTS

WO 2015/010730 A1 1/2015

OTHER PUBLICATIONS

International Search Report and Written Opinion dated Dec. 13, 2013 corresponding to International Patent Application No. PCT/EP2013/054116.
(Continued)

*Primary Examiner* — Patrice L Winder
*Assistant Examiner* — Angela M Widhalm de Rodrig
(74) *Attorney, Agent, or Firm* — Squire Patton Boggs (US) LLP

(57) ABSTRACT

A method includes decomposing functionalities of an node, such as an edge node, of a mobile core domain of a wireless communications system into a plurality of partitions comprised of at least one application part for executing at least signaling plane functions and that interfaces logically to other signaling entities, at least one control part for executing at least transport functions and at least one network element part for executing at least data forwarding functions. The method further includes virtualizing the at least one application part and configuring at least one network element to perform at least one data forwarding function under the direction of the at least one control part. The control part is instantiated as at least one software-defined networking (SDN) controller, and the at least one network element includes a plurality of SDN controller configurable ports to receive data and to send data, and to also perform operations on received data such as tunnel termination/origination,
(Continued)

encryption/decryption, traffic shaping and other needed user plane transport functions. The use of the invention enables a complete virtualization of the mobile core domain to be accomplished.

18 Claims, 11 Drawing Sheets

(51) Int. Cl.
*H04L 12/771* (2013.01)
*H04L 12/775* (2013.01)
*H04L 12/715* (2013.01)
*H04L 12/773* (2013.01)
*H04L 29/08* (2006.01)

(52) U.S. Cl.
CPC .......... *H04L 41/5054* (2013.01); *H04L 45/56* (2013.01); *H04L 45/58* (2013.01); *H04L 45/60* (2013.01); *H04L 45/64* (2013.01); *H04L 67/1087* (2013.01); *H04L 67/16* (2013.01); *H04L 67/28* (2013.01); *G05B 2219/31234* (2013.01)

(58) Field of Classification Search
CPC ......... H04L 45/56; H04L 45/58; H04L 45/60; H04L 45/64; H04L 67/1087; H04L 67/16; H04L 67/28
See application file for complete search history.

(56) References Cited

U.S. PATENT DOCUMENTS

| | | | | |
|---|---|---|---|---|
| 9,015,823 | B2 * | 4/2015 | Koponen | H04L 41/0823 726/13 |
| 9,038,151 | B1 * | 5/2015 | Chua | H04L 45/02 709/223 |
| 9,325,569 | B2 * | 4/2016 | Mogul | H04L 41/069 |
| 9,558,013 | B2 * | 1/2017 | Ryman | G06F 3/0485 |
| 2013/0054761 | A1 * | 2/2013 | Kempf | H04L 12/4633 709/220 |
| 2013/0343174 | A1 * | 12/2013 | Guichard | H04L 45/22 370/218 |
| 2014/0201374 | A1 * | 7/2014 | Ashwood-Smith | H04L 49/70 709/226 |
| 2014/0229945 | A1 * | 8/2014 | Barkai | H04L 49/70 718/1 |

OTHER PUBLICATIONS

Rob Sherwood et al, "FlowVisor: A Network Virtualization Layer," Internet Citation, OpenFlow, Oct. 14, 2009, pp. 1-15, XP002639208, retrieved form Internet: http://www.openflow.org/downloads/technicalreports/openflow-tr-2009-1-flowvisor.pdf.

Kempf J. et al: "Moving the Mobile Evolved Packet Core to the Cloud"; 2012 IEEE 8th International Conference on Wireless and Mobile Computing Networking and Communications (WIMOB 2012); Oct. 8, 2012 (Oct. 8, 2012),—Oct. 10, 2012 (Oct. 10, 2012); pp. 784-791; XP002717394; abstract; p. 785, right-hand column, last paragraph—p. 786, right-hand column, paragraph 2; p. 790, left-hand column, paragraph 5—p. 791, left-hand column, paragraph 2.

A. Doria et al: "Forwarding and Control Element Separation (ForCES) Protocol Specification"; Request for Comments: 5810; Mar. 2010; ISSN: 2070-1721; pp. 1-124; Internet Engineering Task Force (IETF.

H. Khosravi et al: "Requirements for Separation of IP Control and Forwarding"; Request for Comments: 3654; Network Working Group; Nov. 2003; pp. 1-18.

L. Yang et al: "Forwarding and Control Element Separation (ForCES) Framework"; Request for Comments: 3746; Network Working Group; Apr. 2004; pp. 1-40.

J. Halpern et al: "Forwarding and Control Element Separation (ForCES) Forwarding Element Model"; Request for Comments: 5812; Mar. 2010; ISSN: 2070-1721; pp. 1-134; Internet Engineering Task Force (IETF).

International Search Report application No. PCT/EP2013/054116 dated Dec. 13, 2013.

* cited by examiner

SOFTWARE DEFINED NETWORKING FOR EDGE NODES

TECHNICAL FIELD

The exemplary and non-limiting embodiments of this invention relate generally to wireless communication systems, methods, devices and computer programs and, more specifically, relate to software defined networking systems and methods, cloud computing and virtualization techniques, data centers, communications network sharing, gateways used in wireless communications system, in particular those gateways having dual control plane and user plane functionality such as edge nodes.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

Currently two major trends are becoming dominant in communication service provider (CSP) networks: network virtualization (NV) and software defined networking (SDN). However, at present there is no adequate technique to apply these emerging technologies to edge nodes, in particular those nodes that have dual control plane and user plane functionality and that are configurable to interface a mobile core network to other systems and networks.

SUMMARY

The foregoing and other problems are overcome, and other advantages are realized, in accordance with the exemplary embodiments of this invention.

In a first aspect thereof the examples of the embodiments of this invention provide a method that comprises decomposing functionalities of a node of a wireless communications system into a plurality of partitions comprised of at least one application part for executing at least signaling plane functions and that interfaces logically to other signaling entities, at least one control part for executing at least transport functions and at least one network element part for executing at least data forwarding functions. The method further comprises virtualizing the at least one application part and configuring at least one network element to perform at least one data forwarding function under the direction of the at least one control part.

In another aspect thereof the examples of the embodiments of this invention provide an apparatus that comprises at least one processor and at least one memory that includes computer program code. The at least one memory and computer program code are configured, with the at least one processor, to cause the apparatus at least to decompose functionalities of a node of a wireless communications system into a plurality of partitions comprised of at least one application part for executing at least signaling plane functions and that interfaces logically to other signaling entities, at least one control part for executing at least transport functions and at least one network element part for executing at least data forwarding functions. The at least one memory and computer program code are further configured, with the at least one processor, to cause the apparatus at least to virtualize the at least one application part and configure at least one network element to perform at least one data forwarding function under the direction of the at least one control part.

In yet another aspect thereof the examples of the embodiments of this invention provide a network element that comprises a flow table; a first interface for coupling with at least one software defined networking (SDN) controller; and a second interface comprising a plurality of ports configurable by the at least one SDN controller while observing constraints imposed by said flow table. The network element is preconfigured or is configurable to operate on data that is received at a first port, to process the received data in a manner that modifies the received data, and to send processed data from a second port.

BRIEF DESCRIPTION OF THE DRAWINGS

The foregoing and other aspects of the exemplary embodiments of this invention are made more evident in the following Detailed Description, when read in conjunction with the attached Drawing Figures, wherein.

DETAILED DESCRIPTION

In order to provide an appreciation of the various examples of the embodiments of this invention a discussion will first be provided of current network virtualization (NV) approaches, followed by a discussion of current software defined networking (SDN) approaches.

With respect to NV, some network operators are using information technology (IT) data center technologies in their services network, e.g., video on demand (VoD) and content delivery network (CDN). In data centers there is an ongoing trend to "cloudify", i.e., to use virtualization technologies to decouple applications from specific hardware deployments. Typically applications such as video or WEB servers run on virtual machines (VMs) which can be deployed on any suitable hardware. Thus servers and applications may be invoked and subsequently shut down on demand, and the hardware (e.g. IT servers in racks, data storage) may be used almost arbitrarily. If applications are constructed in a suitable manner the same underlying hardware may serve many different types of applications. As opposed to building a proprietary cloud or clouds some service providers may make use of third party clouds. In this case the service providers can add the additional storage and computing capacities available in the third party cloud to an existing service provider cloud. Alternatively a service provider may rely solely on the use of the third party resources (on the third party cloud provider).

The use of cloud and virtualization technologies provides a number of benefits, e.g., only one (or few) hardware platforms are needed, the use can be on demand, assignments can be flexible and the total cost of ownership (TCO) can be dramatically reduced.

In that many operators, including mobile network operators (MNOs), are currently using or considering the use of NV technologies in their services networks, it is a logical next step to explore whether these principles (using one cloud for different applications) can also be applied to other mobile network domains such as the mobile core. The typical mobile core domain can include, for example, an IP multimedia subsystem (IMS), a home subscriber server (HSS) and a packet core, e.g., evolved packet core (EPC).

Figure 1:
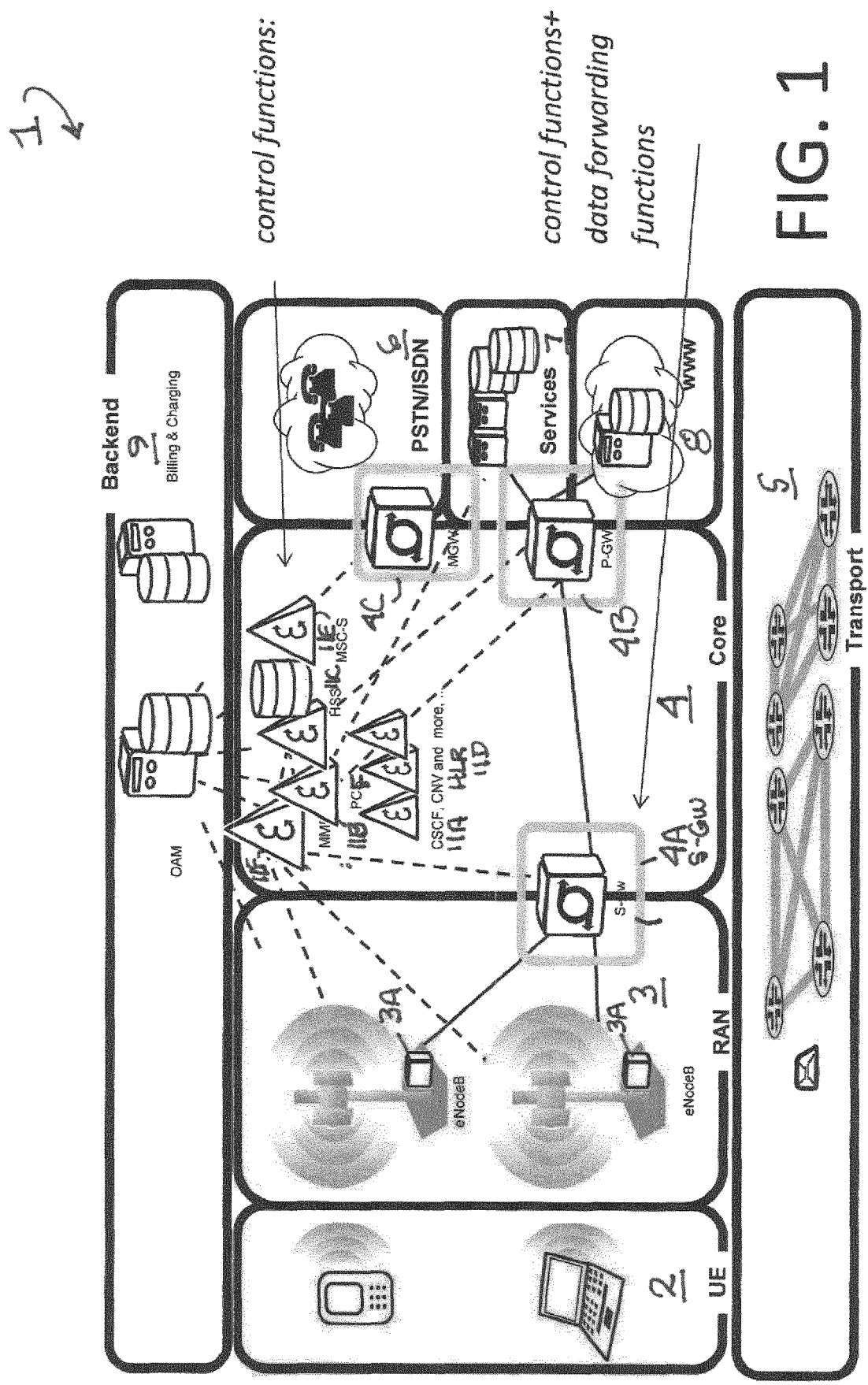
FIG. 1 is a high level diagram of a conventional mobile network and is useful when explaining the concepts of network virtualization (NV).

FIG. 1 is a high level diagram of a conventional mobile network 1 that wirelessly serves user equipment (UE) 2 by using a number of different domains. These domains, in an exemplary long term evolution (LTE) embodiment, can include the radio access network (RAN) 3 containing base stations (evolved NodeBs or eNBs 3A) that are linked to the mobile core network 4 (evolved packet core or EPC) via at least one signaling gateway (S-GW) 4A. The S-GW 4A includes control functions in addition to data forwarding functions and can be considered as an "edge node" of the mobile core network 4 (i.e., at the edge between the mobile core network 4 and the RAN 3).

The domains of the mobile network 1 can also include a transport domain 5, a PSTN/ISDN domain 6, a mobile network services (MNS) domain 7, a WWW domain 8 and a backend domain including, for example, an operations and maintenance (OAM) function and a billing and charging function. The PSTN/ISDN 6 and WWW 8 domains may also be considered as adjacent networks or as foreign or alien networks.

The MNS domain 7 has previously been subjected to some virtualization in some deployments. The embodiments of this invention concentrate more specifically on the nodes of the mobile core 4 and most specifically on the edge nodes of the mobile core 4.

The various control functions of the mobile core 4 can include, as non-limiting examples, an IMS-based call session control function (CSCF) 11A, a policy control function (PCF) 11B, the HSS 110, a home location register (HLR) 11D, a mobile switching center-server (MSC-S) 11E, and a mobility management entity (MME) 11F. In addition, at the edges of the mobile core network 4 there are specific nodes (gateways) which have control functions but that also have data forwarding functions. Through these edge nodes not only signaling messages are passed (control plane or C-Plane) but also payload traffic (user plane or U-Plane) is handled. These edge nodes are shown as the S-GW 4A at the edge of core network 4 to the RAN 3 that was mentioned above, as well as a packet data gateway (P-GW) 4B to the external (alien) networks and also a media gateway (M-GW) 4C to circuit switched (CS) telephony services networks.

Generally the core network functions and nodes can be classified into two categories: (a) pure control plane functions that exchange signaling information and (b) those functions and nodes that have both control functions and data forwarding functions. The first category of pure control plane functions and nodes is currently a focus of network virtualization since these can be "tailored" such that they can run as one or several applications on top of virtual machines in a cloud environment. However, the edge nodes (e.g., S-GW 4A, P-GW 4B and M-GW 4C), due to their dual nature (control and data forwarding) do not lend themselves to simple virtualization following pure data center principles. This is true at least for the reason that in pure IT data center setups there are no nodes that exhibit the characteristics of the dual edge node gateway functionality. Thus, current data center technologies do not provide a suitable solution for gateway virtualization. However, without virtualization of these edge nodes the virtualization of the mobile core remains incomplete and deficient since the full potential of network virtualization cannot be applied to the mobile core network 4.

SDN is another trend that is gaining momentum in CSP networks. Currently the typical nodes found in transport networks comprise specific functionalities. A typical router, for example, comprises in one package: data switching circuitry which moves data packets between different input/output (I/O) ports; control logic that handles the complex routing protocols such as RSVP; and routing tables and related functions. Another example is a carrier Ethernet switch that provides Layer 2 data forwarding and control. In addition various multi-layer switches are used in transport networks to provide MPLS (multi-protocol label switching) functionality which, on top of the above-mentioned router or switch functionality, provide MPLS/G-MPLS signaling capability. In general, and depending on the specific purpose of a transport node, it can be more or less complex to provide data forwarding and control functions in one monolithic node.

One basic idea of SDN is to decouple control functions from data forwarding functions. In other words, and by example, everything that makes a router a router and everything that makes a switch a switch is taken out of the node and placed in a controller. The node can be referred to as a "network element" or NE. What remains in the NE in these two cases would be a pure data forwarding functionality. Using this approach routers, switches, MPLS nodes and the like could all have a similar NE for data forwarding, but a specific control element (which is outside of the NE) which contains the router or switch or MPLS functionality (less the data forwarding/handling functionality).

Figure 2:
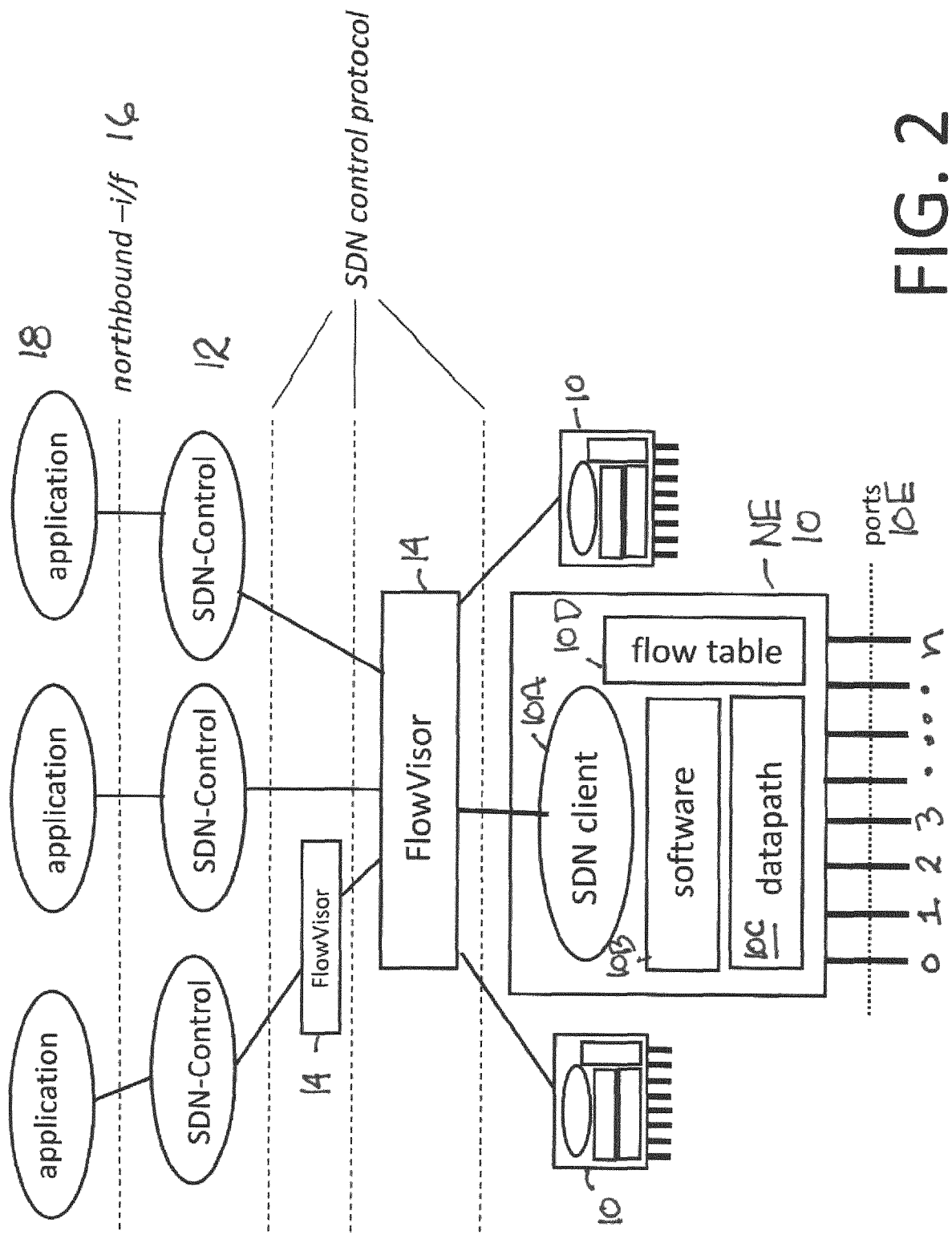
FIG. 2 is a high level block diagram that is useful when describing the concepts of software defined networking (SDN).

FIG. 2 is useful when describing the principles of SDN. In the lower portion of the Figure are shown NEs 10. An exemplary NE 10 includes a SDN client 10A, software 10B, switching hardware (datapath) 10C and a flow table 10D. The datapaths 10C provide I/O ports 10E. The software 10B allows for configuration of the NE 10 while the flow table 10D contains port-based rules for data forwarding. The software 10B can be stored in any suitable type of non-transitory computer readable medium such as semiconductor memory including Flash-type memory.

A non-limiting example of packet handling depending on, for example, header information is now provided. In this example a certain rule may be that incoming packets on port 0 are analyzed such that depending on what information is in the packet header the packet is forwarded to port 2 or to port 3. These rules, which are stored in the flow table 10D, can be passed to the NE 10 from a controller which resides external to the NE 10 (denoted as the SDN control 12). For this purpose a protocol for exchange is specified and both the SDN controller 12 and the NE 10 are able to mutually understand the protocol (embodied in the functionality of the SDN client 10A of the NE 10).

One representative example of an SDN control protocol is OpenFlow (a Trademark of Stanford University) as specified in the Open Network Foundation (ONF). Another representative SDN control protocol is known as Forwarding and Control Element Separation (ForCES, see RFC 5810, March 2010, as well as, e.g., RFC 3654, RFC 3746 and RFC 5812.)

Shown by way of example and not as a limitation is a FlowVisor 14: a special purpose OpenFlow controller that acts as a transparent proxy between OpenFlow switches and multiple OpenFlow controllers.

Using these techniques a system for sharing transport equipment can be constructed. The NEs 10 and SDN controllers 12 can be cascaded and access can be limited. For example, introducing the FlowVisors 14 can limit access to certain parts of the flow table 10D (e.g., can limit access of the SDN controller 12 to only ports 0, 1, 2 and 3 of the NE 10). The SDN controllers 12 themselves may act as proxies to other controllers and may provide a ("northbound") interface (i/f) 16 to one or more applications 18. The applications 18 may acquire network resources via the interface 16 in an abstracted manner, e.g., "connectivity between topological point A and topological point B with a given bandwidth". The SDN controllers 12 may then instruct one or more NEs 10 out of a pool of NEs to fulfill the request of the application 18. In practice there could be several options available to the SDN controller 12 to satisfy the request made by the application 18. The abstract interface 16 effectively hides the specifics and complexities of the network hardware from the applications 18.

To summarize the description thus far it was shown that one major obstacle to providing a fully virtualized mobile core 4 is the presence of the edge gateways or edge nodes 4A-4C in FIG. 1, as existing data center technologies do not offer appropriate capabilities. The concepts involved in VN and SDN were also explained.

An aspect of the embodiments of this invention is an appreciation that SDN represents a technology that can aid in overcoming the deficiencies of NV if the edge gateways can be decomposed such that the control part can be virtualized and moved into a data center cloud environment, or more simply into the cloud, while the remaining forwarding part is implemented by means of SDN. However, existing approaches to apply SDN are not adequate to properly address this problem.

Figure 3:
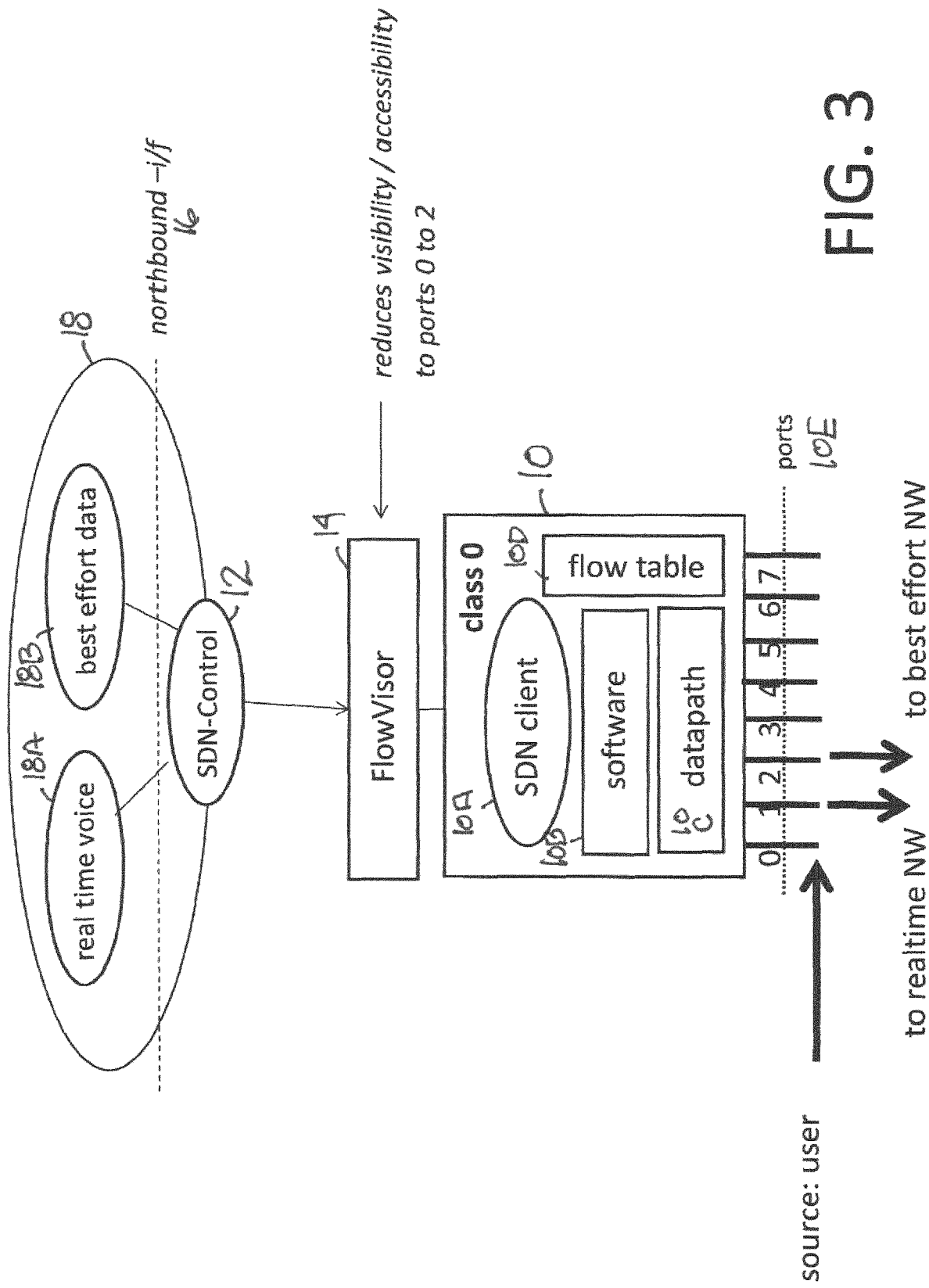
FIG. 3 shows a more specific example of the general SDN architecture of FIG. 2 and is useful in explaining the issues involved by presenting an example of how SDN can be applied to a typical network services scenario. The NE depicted in Figure can be considered to represent a class 0 NE.

FIG. 3 shows a more specific example of the general SDN architecture of FIG. 2 and is useful in explaining the issues involved. FIG. 3 presents an example of how SDN could be applied to a typical network services scenario. At the top level there is an application 18 which uses two types of communication services, real time voice 18A and best effort data 18B. The application 18 could implement, as a non-limiting example, a shopping portal where a user can browse in a virtual shop while in parallel can conduct an ongoing voice-over-internet protocol (VoIP) call with a hotline to ask questions concerning displayed merchandise. In a virtualized network the application 18 may request connectivity to an SDN controller 12 (which may or may not be embedded in the application 18) using an abstract northbound interface 16. The request could take the form of, by example, "real time connection between A and B and best effort connection between A and C". The real time connection would be used for the VoIP call while the best effort connection would be used for the typically much lower speed browsing inputs (e.g., clicks). In response to the request from the application 18 the SDN controller 12 can configure one or several NEs 10 (the example of FIG. 3 shows but a single NE 10 for simplicity).

Note that the NE 10 could be shared between several SDN controllers 12 and thus, to avoid conflicts, the FlowVisor 14 (or some other type of suitable subsystem) allows manipulations only of ports 0, 1 and 2 for the SDN-controller 12 that implements the shopping portal application.

In operation the SDN controller 12 manipulates the accessible part of the flow table 10D such that at the NE 10 incoming traffic on port 0 (which can comprise real time voice traffic and best effort data traffic from the user) is analyzed. If packet traffic header information contains an indication that VoIP is used (e.g., a real-time transport protocol (RTP) header is present) then the traffic is forwarded to a high performance part of the network (which in this example is accessible through port 1), while all other traffic (e.g., the best effort traffic) is forwarded to port 2.

This is one exemplary and typical deployment scenario for SDN-enabled nodes that serves to illustrate a drawback of using this approach. That is, the separation into control functions and data forwarding functions basically just converts the NE 10 into a simple forwarding engine that only allows for relaying or switching data packets from one port to another port without any further manipulation. Because of this fundamental limitation this type of NE 10 will be subsequently referred to and further denoted for convenience, and not by way of limitation, as a "class 0 NE" or as a "NE class 0". Note that while the class 0 NE may be well suited for pure transport packet transmission it is not well suited for relaying transport user data information that requires specific interworking on the forwarding plane. Examples of typically needed U-Plane data modifications, in the context of the mobile core network 4 of interest to this invention, include: GTP tunnel handling, policy enforcement/traffic shaping, encryption/decryption and stateful interworking, i.e., making data forwarding dependent on (user) authentication. As can be appreciated, in operation such U-Plane functions can be quite complex.

For example, the general packet radio system (GPRS) Tunneling Protocol User Plane (GTP-U) is a protocol used over the S1-U, X2, S4, S5 and S8 interfaces of the evolved packet system (EPS). GTP-U tunnels are used to carry encapsulated transport protocol data units (T-PDUs) and signaling messages between a pair of GTP-U tunnel endpoints. A tunnel endpoint identifier (TEID), present in the GTP header, indicates which tunnel a particular T-PDU belongs to.

Current SDN approaches do not properly address these types of issues, while modern edge nodes such as the S-GW 4A and the P-GW 4B require this type of functionality since S-GWs and P-GWs handle GTP tunnels, and the P-GWs perform policy enforcement.

The embodiments of this invention address and overcome these problems by allowing virtualization of mobile core domain 4 nodes such as gateway nodes (edge nodes), in such a manner that the application-related parts (control plane) may run in data center environments (e.g., in a cloud environment) while the forwarding plane is implemented using SDN principles that are enhanced such that specifically needed gateway functions can be incorporated and implemented.

A "cloud environment" may be considered for the purposes of describing the exemplary embodiments of this invention as including any types of suitable data processors, servers, mass storage devices, network interfaces and switches, and any other hardware/software/operating systems and the like that are needed in order to host one or more virtual machines executing one or more client applications, such as an HSS application, a MME application and a PCF application, as three non-limiting examples of applications that can be run when virtualizing the mobile core network 4.

One non-limiting aspect of this invention is an expansion of the types of mobile core network 4 applications that can be instantiated in the cloud to include the application parts or partitions (after decomposition) of the gateway nodes (edge nodes) of the mobile core network 4.

In accordance with the examples of the embodiments of this invention different classes of NEs are introduced, while considering as an example but not by way of limitation a current state of the art NE as being of class 0 (as shown in FIG. 3 and discussed above).

Figure 4:
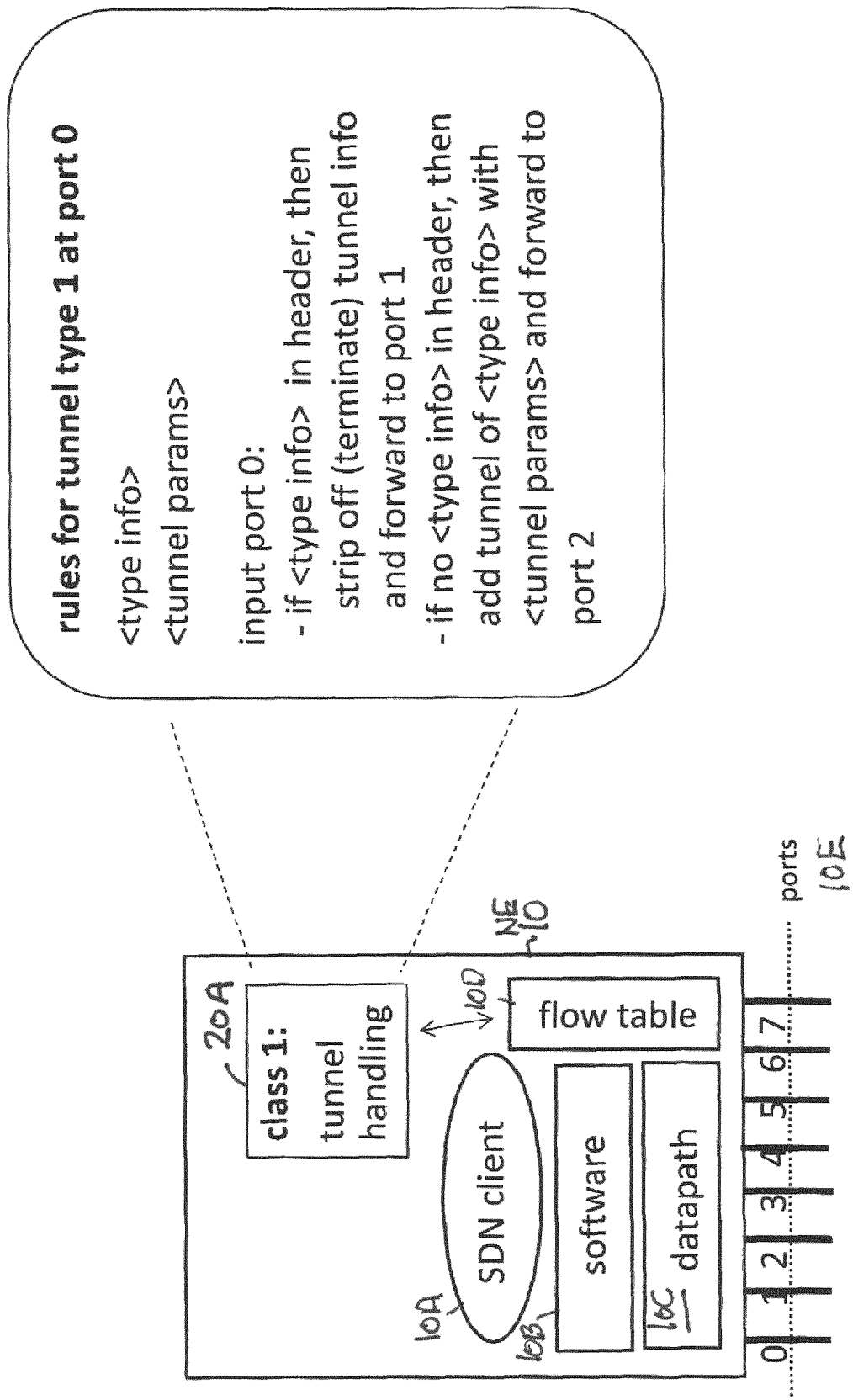
FIG. 4 shows an embodiment of a class 1 NE in accordance with embodiments of this invention that can be used for tunneling applications.

Following this classification approach NEs 10 are modified to include additional functionality beyond pure packet forwarding, such as tunnel handling capabilities. FIG. 4 shows a node that is capable of handling tunnels such as, but not limited to, the GTP-U tunnels mentioned above. Tunnels in this context mean that data packets may be enveloped or encapsulated in another frame with a tunnel header and with the tunnel having endpoints (node A, node B). Typical examples of tunnels are the GTP tunnels as used in mobile core networks and those implemented with Point-to-Point Protocol over Ethernet (PPPoE) encapsulation. PPPoE is a network protocol for encapsulating PPP frames within Ethernet frames and can be used in fixed DSL networks.

The extensions to an NE 10 (which converts it into the class 1 NE of FIG. 4) comprise additional rules 20, i.e., tunneling rules 20A that can be applied to tunnel types and/or ports. As an example, the class 1 NE 10 can be defined to terminate all GTP tunnels that are received through port 0, strip off tunnel frames and forward to port 1. In addition, the class 1 NE can be defined such that all non-tunneled packets received through port 0 are supplied with tunneling framings according to parameters given in the rules 20 (the tunnel handling rules 20A defining tunnel end point address).

An exemplary set tunnel handling rules 20A can be as follows:
rules for tunnel type 1 at port 0
<type info>
<tunnel params>
input port 0:
  if <type info> in header, then
    strip off (terminate) tunnel info and forward to port 1
  if no <type info> in header, then
    add tunnel of <type info> with <tunnel params> and forward to port 2

The SDN control protocol 12 is thus extended to allow for the transfer of tunneling rules 20A from the SDN controller to the class 1 NE 10 and to thereby enhance at least the content of the flow table 10D and the functionality of the NE 10.

Figure 5:
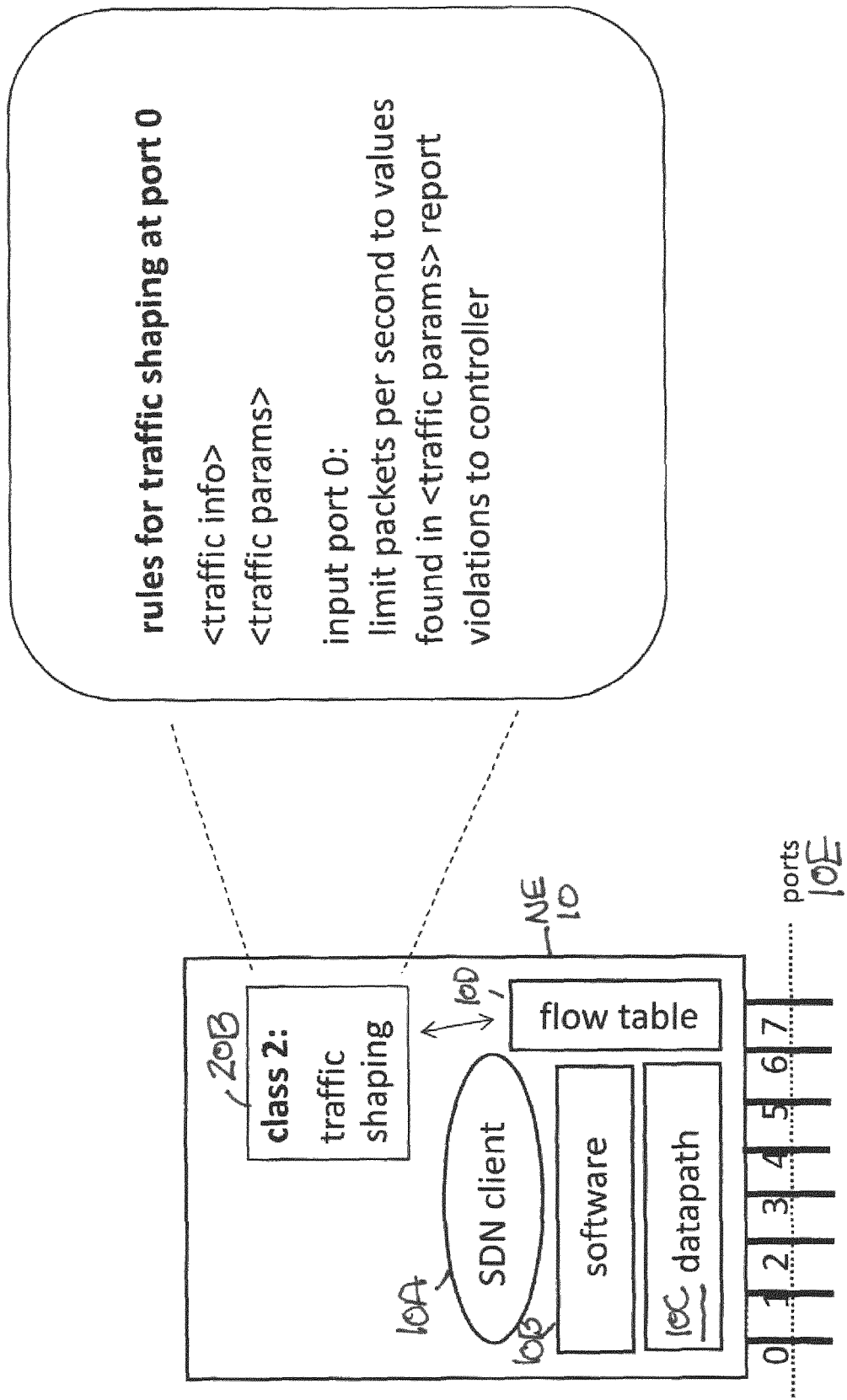
FIG. 5 shows a non-limiting example of a class 2 NE which enables rules to be stored to implement traffic shaping/policy enforcement.

FIG. 5 shows a non-limiting example of a class 2 NE 10 which enables rules 20B to be stored to implement traffic shaping/policy enforcement.

Such a traffic shaping/policy enforcement rule 20B could comprise, by example, "all traffic on port 0 with a given source IP address in the header shall be manipulated such that a maximum throughput of 10 MBit/s is achieved. In case the data stream exceeds the limitation (or drops below a threshold), then the SDN controller 12 shall be informed". Stated more formally, the traffic shaping/policy enforcement rule 20B can comprise:
rules for traffic shaping at port 0
<traffic info>
<traffic params>
input port 0:
  if <traffic info> in header, then
    limit packets per second to values found in <traffic params> report violations to controller In this non-limiting example the <traffic info> could specify at least the IP source address.

Figure 6:
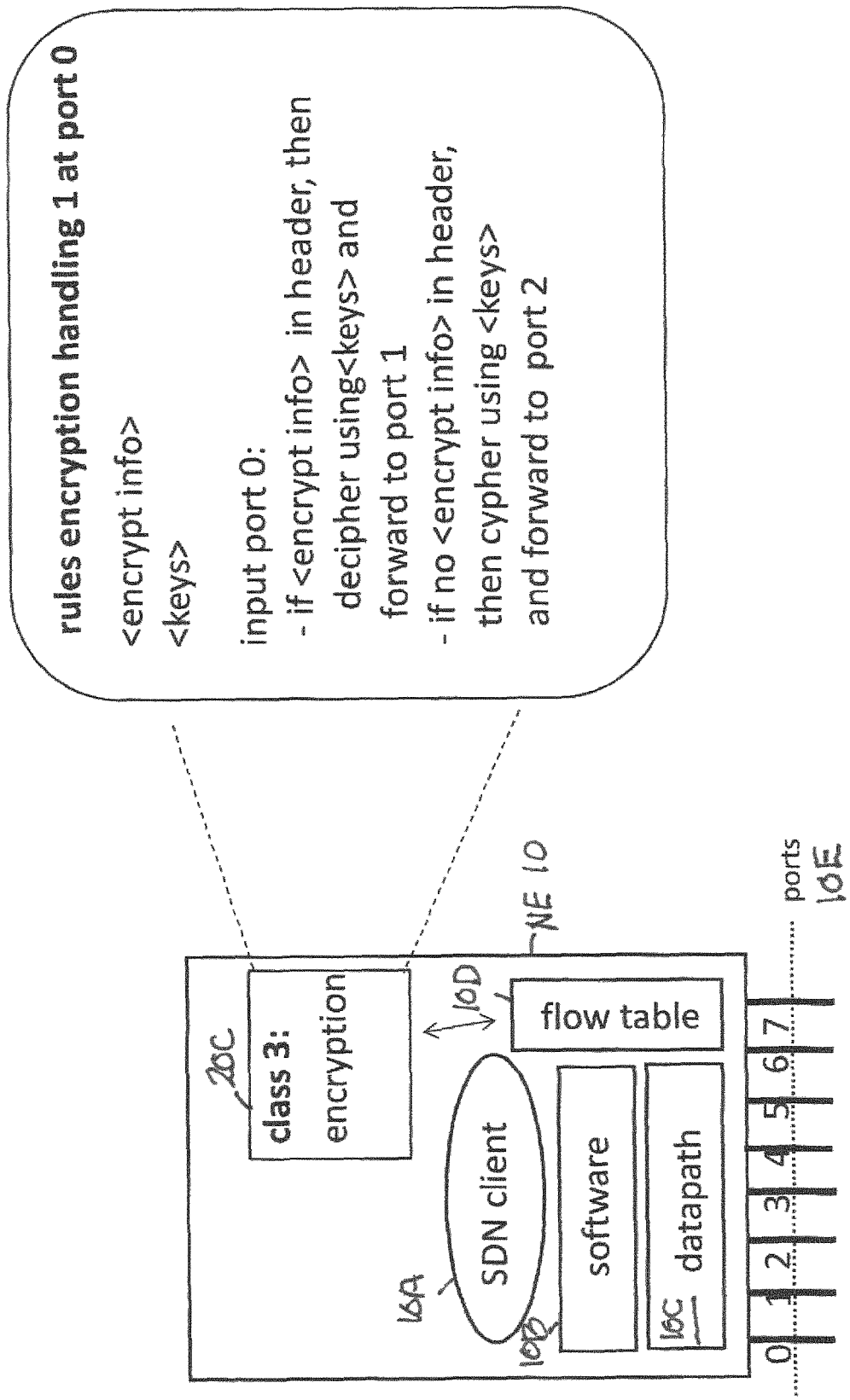
FIG. 6 shows a non-limiting example of a class 3 NE which enables rules to be stored to cipher/decipher selected data streams with applicable encryption parameters.

A further NE class is shown FIG. 6. In this embodiment a class 3 NE 10 operates to cipher/decipher selected data streams with applicable encryption parameters (such as keying material) specified in rules 20C provided by the SDN controller 12. In the illustrated example, and still considering that the NE 20 is constrained, for example by the FlowVisor (or similar) functionality 14, to use only ports 0-2, ciphered data received on port 0 is deciphered and forwarded to port 1 while unciphered (e.g., plain text) data received on port 0 is ciphered using <keys> parameters and sent to port 2.

Stated more formally, the encryption handling rule 20C can comprise:
rules encryption handling 1 at port 0
<encrypt info>
<keys>
input port 0:
  if <encrypt info> in header, then
    decipher using <keys> and forward to port 1
  if no <encrypt info> in header,
    then cypher using <keys> and forward to port 2

It can be noted with regard to this exemplary embodiment that the class 3 NE 10 can be constructed to include certain hardware, e.g., an encryption engine chip, a higher performance data processor, additional memory/faster memory, than would be present in a different type of NE 10, e.g., in a class 1 NE 10. In like manner the class 1 NE can be constructed to include hardware resources specifically tailored to perform high speed tunnel handling operations. In general the NEs 10 can be designed to support some desired maximum level of functionality, although in some cases they could also be re-programmed/re-purposed to support some lower level of functionality if needed.

Figure 7:
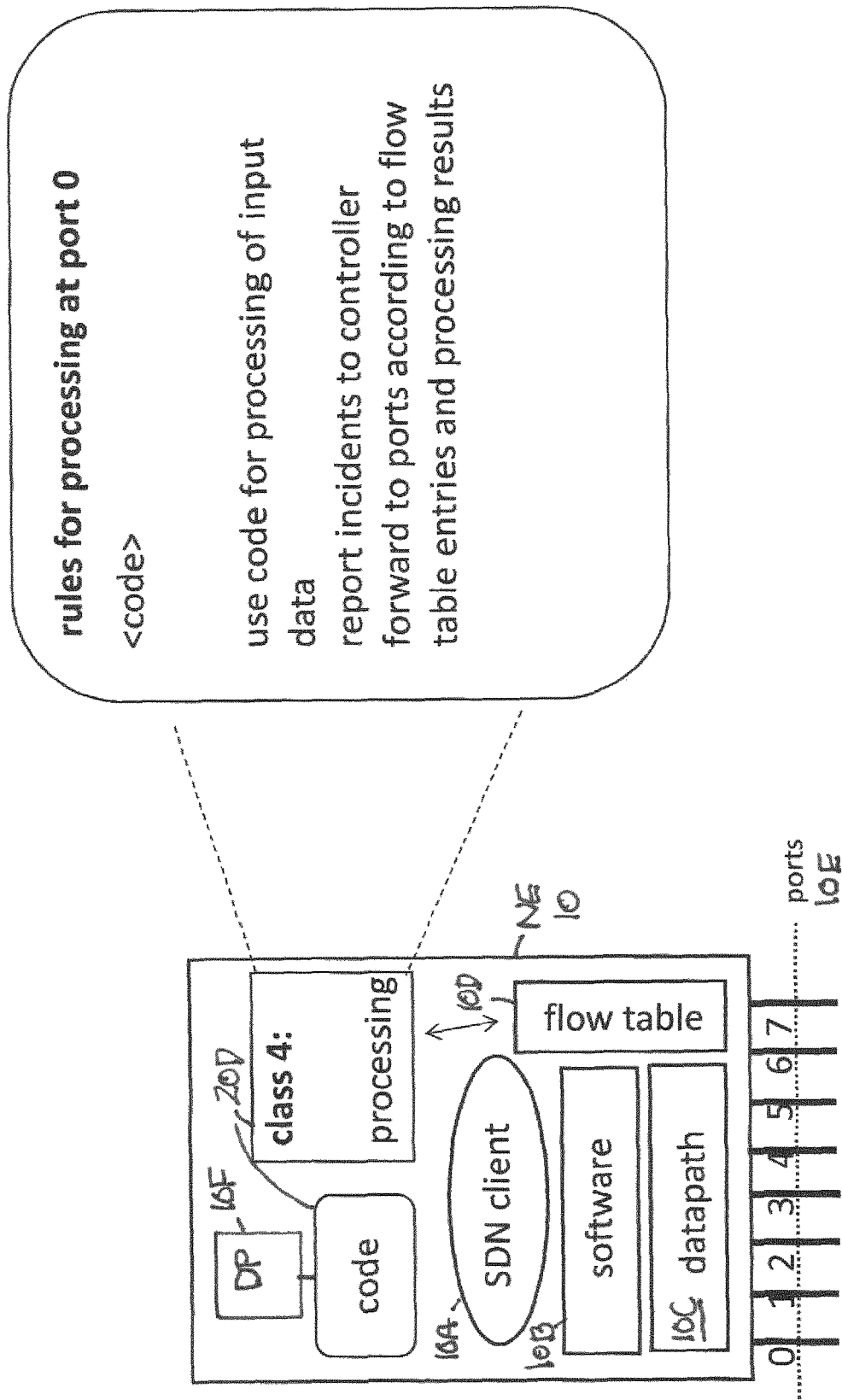
FIG. 7 shows a non-limiting example of a class 4 NE which enables rules to be stored comprised of specific executable code that configures the NE to perform a desired function or functions relating to data received and sent via input/output ports.

FIG. 7 illustrates a class 4 NE 10 that can allow a further significant extension of functionality through downloading rules comprised of specific code 20D. Here no specific NE functionality needs be determined beforehand. If specific functionality is required then executable code 20D providing the desired capabilities is downloaded to the NE 10, such as from the SDN controller 12. This may be accomplished via an OpenFlow Control Path and/or by downloading directly through a given port 10E with an indication (e.g., in the header) that the associated data is executable code meant for the NE 10. In this case the NE 10 includes some data processor (DP) functionality 10F having the capability to execute the code 20D. If the specific functionality is no longer required then the code 20D can be erased and/or it can be overwritten with different code to provide the NE 10 with a different capability or capabilities as needed. In general the executable code 20D can be stored in any suitable type of non-transitory computer readable medium such as semiconductor memory including Flash-type memory. The executable code 20D could be stored in the same memory device as the software 10B or in a separate memory device.

In this example the rules can be expressed as follows:
rules for processing at port 0
<code>
use code for processing of input data (port 0)
report any incidents to controller
forward to ports (1 or 2) according to flow table entries and processing results It should be noted that the class 4 NE 10 could be used to implement, for example, one or more of the class 0, class 1, class 2 and class 3 NEs by providing appropriate code 20D, such as code that includes encryption/decryption code in the case of the class 3 NE. Further in this regard, and while all NE classes (e.g., 0, 1, 2 and 3) could potentially be implemented with one NE class 4 containing appropriate code 20D, in this case it may be necessary for the network operator to store code images for different purposes for all possible network operator NE vendors. The network operator may further then need to manage which code image matches which NE vendor for which desired functionality. One result is that the network operator could require detailed knowledge of the hardware of the various NEs sourced by various vendors. Furthermore, using one generic NE capable of supporting all NE classes could result in some cases where the NE has more inherent capability (e.g., processing power, memory speed and/or capacity), and hence more cost, that what is actually required for a particular task. Being able to acquire already classed NE hardware (e.g., a class 2 or a class 3 NE) can thus potentially allow the network operator to better trade off needed functionality versus cost.

Using the teachings of this invention it becomes possible for vendors and others to specialize in specific classes of data forwarding NEs 10 and provide solutions suitable for different environments. Additionally it becomes possible to combine different classes of NEs 10 such that a network operator can easily and quickly reconfigure at least the transport network and assign functionality according to given circumstances.

Figure 8:
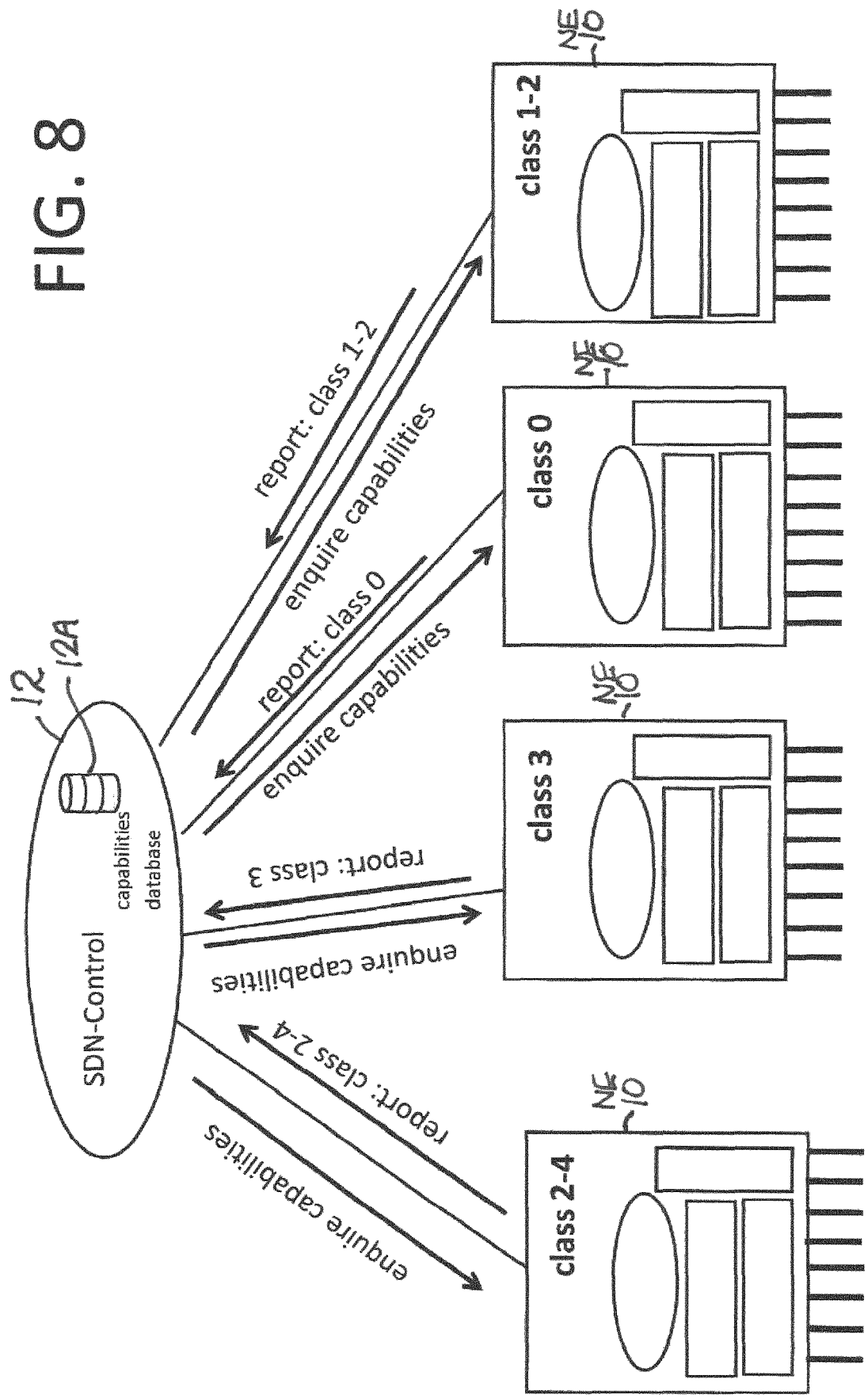
FIG. 8 shows a non-limiting example of an embodiment where an SDN controller can use a plurality of NEs having differing capabilities, and can query the NEs to determine their respective capabilities.

FIG. 8 shows a non-limiting example of an embodiment where an SDN controller 12 can take maximum advantage of combining different classes of network forwarding elements. In this embodiment the SDN controller 12 contains or otherwise has access to a database 12A that stores the capabilities of different NEs 10. In order to keep the database 12A updated the SDN controller 12 can issue a "capabilities enquiry" request to a population of available NEs 10 which in turn report the type or types of classes that they support. Thus there could be present NEs 10 which support only pure forwarding (class 0) while others may support one or a combination of additional functionality as described above (e.g., class 3, classes 2, 3 and 4, classes 1 and 2, etc.) In this case the SDN client 10A can be configured to at least respond to the capabilities enquiry and return a response.

Upon a request of an application 18 through the northbound interface 16 the SDN controller 12 can configure appropriate NEs 10 and gain further flexibility by taking into account the additional functionality of the different classes that are present.

Figure 9:
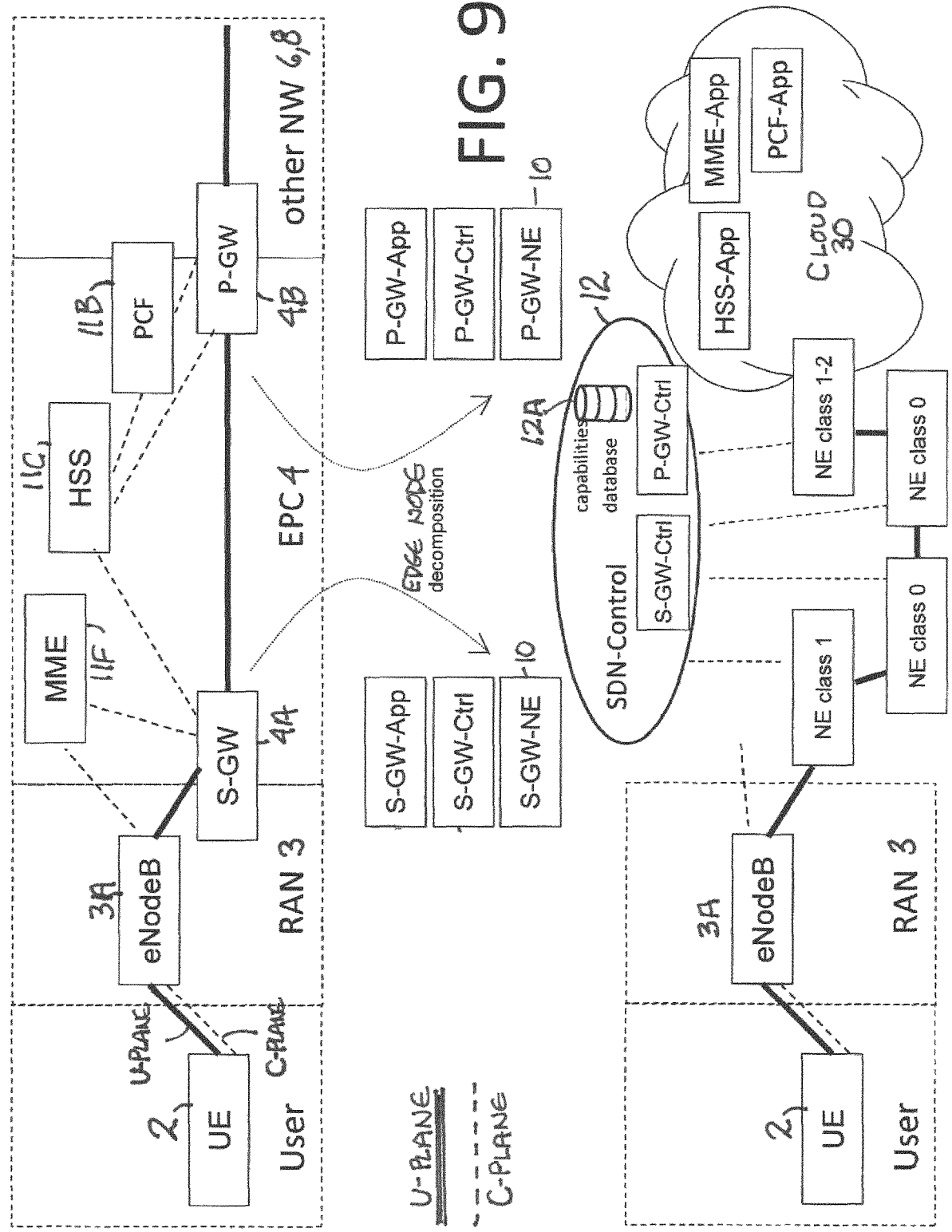
FIG. 9 depicts a non-limiting example of one possible implementation of the exemplary mobile network shown in FIG. 1, where the implementation takes advantage of the various NE embodiments shown in FIGS. 3-5 and 8.

FIG. 9 describes a non-limiting example of an implementation for the network example shown in FIG. 1 that solves the problems described above by taking advantage of the embodiments shown in FIGS. 3-8.

In the upper portion of FIG. 9 there is shown a simplified architecture of a conventional mobile network 1, without virtualization or software-defined networking (SDN). The UE 2 sends and receives payload data (U-plane, solid line through base station (eNB 3A) and gateways (S-GW 4A, P-GW 4B)) to and from destinations which may be, for example, a server in the web (e.g., in the WWW domain 8 shown in FIG. 1). In order to provide proper service delivery some control information is exchanged over the C-Plane (dotted lines) between various network elements as specified for a 3G/4G cellular network (or other types of cellular and non-cellular networks). The EPC 4 in this non-limiting example is shown to include just the MME 11F, the HSS 11C and the PCF 11B, although other EPC 4 elements and functions would be present as well.

The lower portion of FIG. 9 shows the mobile network 1 with the same functionality as in the upper portion, but wherein parts of the core network (EPC 4) are virtualized. For example, control functions such as the HSS 11C, MME 11F and the PCF 11B run as applications HSS-App, MME-App and PCF-App in a cloud computing environment 30.

In accordance with embodiments of this invention, and in order to achieve full virtualization, the edge nodes are decomposed and re-arranged following the principles described above.

It can be noted that, by way of example, in LTE the S-GW 4A protocols and interfaces may include: an S11 control plane stack to support an S11 interface with the MME 11F, S5/S8 control and data plane stacks to support an S5/S8 interface with the P-GW 4B, an S1 data plane stack to support an S1 user plane interface with the eNB 3A, and an S4 data plane stack to support an S4 user plane interface between the RNC of UMTS and S-GW of the eNB. Further by way of example, in LTE the P-GW 4B protocols and interfaces may include the S5/S8 control and data plane stacks to support the S5/S8 interface with the S-GW 4A.

As an intermediate step (shown in the central portion of FIG. 9) these functionalities of the S-GW 4A and the P-GW 4B are each de-composed into three sections or partitions. These partitions include an Application part (S-GW-App, P-GW-App) that comprises, for example, all GW signaling functions (typically those specified in the applicable wireless network standard(s)). Generally speaking the Application part includes the software that interfaces logically to other signaling entities. For example, the S-GW-App communicates logically with the MME 11F, the eNB 3A and the HSS 11C. Most preferably, the Application part is designed in a way that it can run on top of a virtual machine in the cloud 30, and can then be added as another application running in the cloud 30 along with, for example, the MME-App and HSS-App (and any other Apps that may be virtualized and instantiated in the cloud 30).

Another result of the edge node decomposition is the creation of the Control part (partition) (S-GW-Ctrl, P-GW-Ctrl). These represent the control functionality (SDN control 12) that has been removed from the existing S-GW/P-GW edge nodes. The Control part is used to steer the transport resources as described above. Most preferably, the Control part can be designed as an extension of an existing overall network controller and then it may be added to the SDN controller 12, or more simply it is the SDN controller 12.

Another result of the edge node decomposition is the Network Element 10 part (S-GW-NE, P-GW-NE). This represents the data forwarding part of each formerly monolithic gateway node. The S-GW-NE and P-GW-NE follow the principles of SDN (i.e., it can be steered/controlled by the SDN controller 12). Most preferably it is equipped with the various examples of the extensions described in FIGS. 3-7.

In accordance with these embodiments of the invention, and when for example a S-GW 4A is to be put into service, the network operator, using one or more data processing systems, launches the necessary number of applications (S-GW-Apps) on virtual machines in the cloud 30. The necessary number of launched applications is the number needed to match the needed performance requirements (e.g., three instances of the S-GW-App to achieve a maximum of 5000 transactions per minute). Through the northbound interface 16 the S-GW-App makes a request for appropriate connectivity and functionality to the SDN controller 12. For example a request is made for connectivity from the eNB 3A to the S-GW with 10 GBit/s and GTP tunnel capability. The SDN controller 12 has an overview of the network topology (which NE 10 is connected where and to whom) and the capabilities of each NE 10 (e.g., class 0 to class 4) and can assign appropriate functionality to the NE 10. Note that a certain NE 10 that was being used solely for pure packet forwarding (e.g., as a router) may on demand be at least partially configured as an S-GW-NE to provide class 1 capabilities which can be used to fulfill a given request. At another time the full S-GW capacity might not be needed and so the SDN controller 12 may reconfigure the NE 10 such that it is used again simply as a router, possibly enabling it to be shared with another operator.

In this type of scenario the cloud 30 environment could be one hosted by a third party cloud provider, and the SDN controller 12 and NEs 10 can be hardware/software entities hosted by one or more data processing and other systems of the network provider (or by some other party in some cases).

One non-limiting example of the use of this functionality could be an occurrence of an event at a certain location (e.g., a stadium hosting a sporting match) where there is a temporary high demand for additional gateway functionality. In this case the operator can flexibly react by converting a simple router NE into a gateway NE, and when the event is over, re-assign the NE back to the router function.

Figure 10:
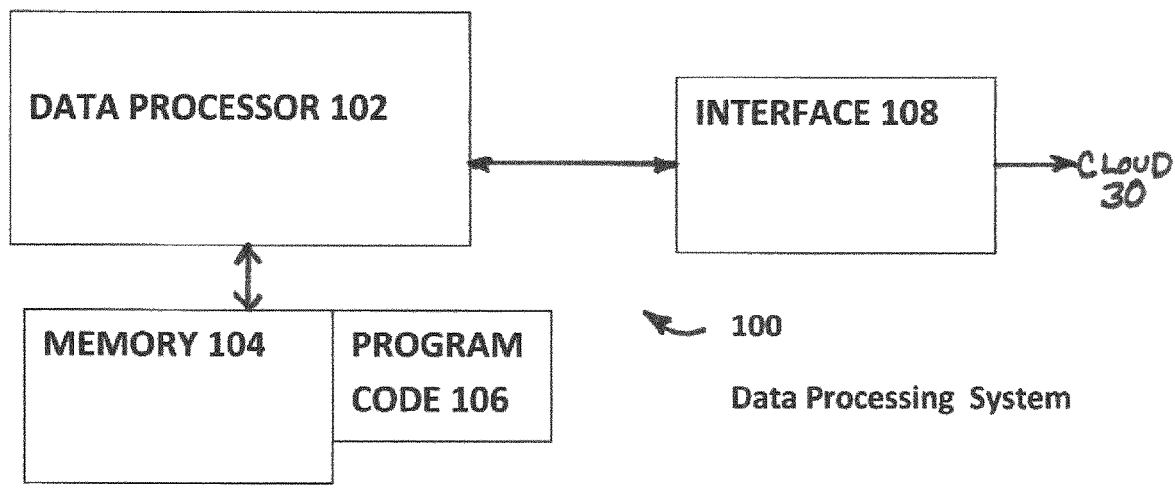
FIG. 10 illustrates a data processing system that is owned by or otherwise usable by a network operator and that is configurable to perform at least some of the methods/processes in accordance with the embodiments of this invention.

A data processing system 100 that is owned by or at least otherwise usable by a network operator is shown in FIG. 10. The data processing system 100 includes at least one data processor 102, at least one memory 104 storing program code 106 that is executable by the data processor 102, and at least one interface 108 enabling communication with, for example, the cloud computing environment 30 shown in FIG. 9. By the use of the data processing system 100 the network operator, or some agent of the network operator, is enabled to decompose functionalities of a node, such as an edge node, of the mobile core domain 4 of the wireless communications system 1 into a plurality of partitions comprised of at least one application part for executing at least signaling plane (C-Plane) functions. The application part can be considered simply for purposes of explanation as that part of the edge node that interfaces logically to other signaling entities. Another partition that results from the decomposition of the edge node by the data processing system 100 (e.g., by operation of the program code 106) is at least one control part for executing at least transport functions. Another partition that results from the decomposition of the edge node by the data processing system 100 is the at least one network element part (NE 10). The combination of the control part and the network element part are configurable for jointly executing at least data forwarding (U-Plane) functions of the edge node. Once the partitions have been created the data processing system 100 can interact with the provider of the cloud 30 (if the cloud environment is not hosted by the network operator) to virtualize the at least one application part. The data processing system 100 is also programmable to configure at least one NE 10 to perform at least one data forwarding function under the direction of the at least one control part. The control part can be instantiated by the data processing system 100 as at least one software-defined networking (SDN) controller 12. The at least one NE 10 includes the plurality of SDN controller configurable ports 10E to receive data and to send data, and is also preconfigured or configurable (e.g., via downloaded code) to perform operations on received data such as tunnel termination/origination, encryption/decryption, traffic shaping and other needed user plane transport functions.

During operation of the wireless communications system 1 the data processing system 100 is enabled to reconfigure/repurpose if needed one or more of the NEs 10 via the virtualized application parts (e.g., S-GW-Ctrl-App) and the SD controller(s) 12. One or more of the NEs 10 could also possibly be shared with one or more other network operators.

The data processing system 100 could itself be instantiated in the same cloud 30 shown in FIG. 9 or in a different cloud environment. In this case the data processor 102, memory 104, etc. can all be logically resident in some cloud computing environment and the program code 106 can be an application or applications executed by one or more virtual machines (VMs) that are instantiated in the cloud computing environment.

It should be appreciated that there are a number of advantages and benefits that can be realized from the use of the embodiments of this invention. For example, the use of the embodiments of this invention, including the decomposition/partitioning aspects thereof, enables a complete virtualization of the mobile core network to be accomplished, including the edge nodes. Further by example, the use of the embodiments of this invention enables a very flexible re-assignment of resources to be accomplished and further allows for compensations to be made for fluctuations in wireless network loading. Further by example, the use of the embodiments of this invention enables proven technologies such as SDN and virtualization to be extended and exploited to provide new and important functionalities in the wireless network area. Further by example, the use of the embodiments of this invention enables sharing of resources between operators to occur and facilitates the hosting of core networks. Still further by example, the use of the embodiments of this invention enables large TCO reductions to be realized since resources can be used (and re-used) in an optimized manner.

Based on the foregoing it should be apparent that the exemplary embodiments of this invention provide a method, apparatus and computer program(s) to accomplish a virtualization of a mobile core network including, but not limited to, those nodes having dual signaling plane and user data plane functionalities, such as the signaling gateway and the packet data gateway.

Figure 11:
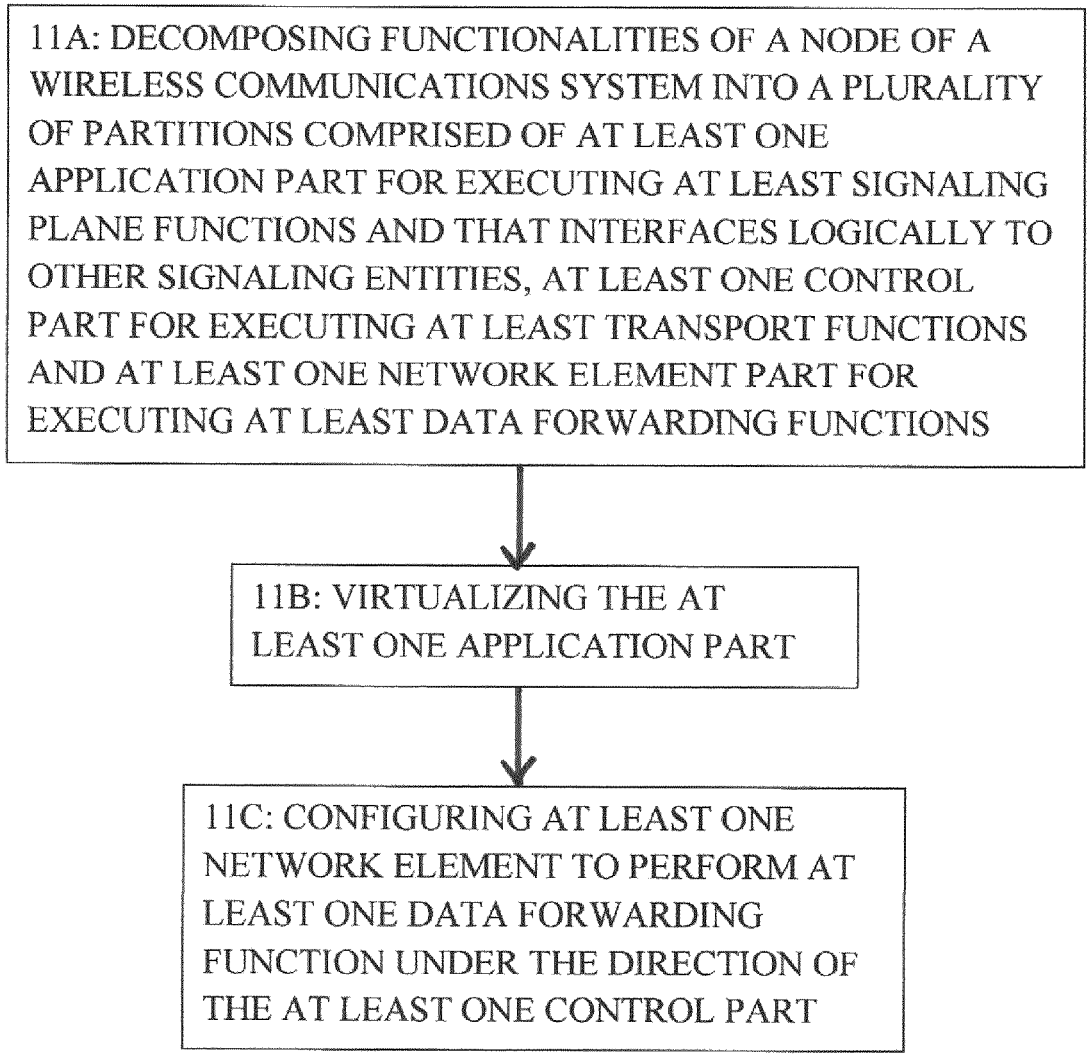
FIG. 11 is a logic flow diagram that illustrates the operation of a method, and a result of execution of computer program instructions, in accordance with the exemplary embodiments of this invention.

FIG. 11 is a logic flow diagram that illustrates the operation of a method, and a result of execution of computer program instructions, in accordance with the exemplary embodiments of this invention. In accordance with these exemplary embodiments a method performs, at Block 11A, a step of decomposing functionalities of a node of a wireless communications system into a plurality of partitions comprised of at least one application part for executing at least signaling plane functions and that interfaces logically to other signaling entities, at least one control part for executing at least transport functions and at least one network element part for executing at least data forwarding functions. At Block 11B there is a step of virtualizing the at least one application part. At Block 110 there is a step of configuring at least one network element to perform at least one data forwarding function under the direction of the at least one control part.

In accordance with the method shown in FIG. 11, the step of configuring can be performed in response to a request made to the at least one control part by the at least one application part.

In accordance with the method shown in FIG. 11, the step of virtualizing operates to instantiate the at least one application part on a virtual machine in a cloud environment.

In accordance with the method shown in FIG. 11 and discussed above, the method further comprises instantiating the control part as at least one software-defined networking (SDN) controller, and where the at least one network element can be comprised of a plurality of SDN controller configurable ports to receive data and to send data.

In accordance with the method shown in FIG. 11 and discussed above, the at least one network element can be further configured to receive data from a tunnel at a first port, to terminate the tunnel and to send data that was encapsulated in the tunnel from a second port.

In accordance with the method shown in FIG. 11 and discussed above, the at least one network element can be further configured to receive data at a first port, to encapsulate the data in accordance with predetermined tunnel parameters, and to send the encapsulated data as tunneled data from a second port.

In accordance with the method shown in FIG. 11 and discussed above, the at least one network element can be further configured to perform traffic shaping for data received at a first port in accordance with predetermined traffic shaping parameters, and to send the traffic shaped data from a second port.

In accordance with the method shown in FIG. 11 and discussed above, the at least one network element can be further configured to perform encryption of data received at a first port in accordance with predetermined encryption parameters, and to send the encrypted data from a second port.

In accordance with the method shown in FIG. 11 and discussed above, the at least one network element can be further configured to perform decryption of encrypted data received at a first port in accordance with predetermined decryption parameters, and to send the decrypted data from a second port.

In accordance with the method shown in FIG. 11 and discussed above, the at least one network element can be further configured to store executable code defining processing rules, to perform processing of data received at a first port in accordance with the processing rules, and to send the processed data from a second port.

In accordance with the method shown in FIG. 11 and discussed above, the at least one network element can be further configured to receive data at a first port, to examine the received data, and to route the data to either a second port or a third port based on information stored in a flow table.

In accordance with the method shown in FIG. 11 and discussed above, the at least one network element is comprised of n ports and where the SDN controller is constrained to use m ports, where $m<n$.

In accordance with the method shown in FIG. 11 and discussed above, the SDN controller is a first SDN controller coupled with a first virtualized application, and where there can be a second SDN controller that is coupled with a second virtualized application and that uses at least one port not used by the first SDN controller.

In accordance with the method shown in FIG. 11 and discussed above, the SDN controller can be coupled with a network element capabilities database. In this case the method further comprises sending a capabilities enquiry to one or more network elements, receiving a capabilities response from the one or more network elements, and storing network element capabilities information in the capabilities database.

In accordance with the method shown in FIG. 11 and discussed above, where a capabilities response received from a particular network element indicates that the network element has at least one or more of a routing capability, a tunnel handling capability, an encryption/decryption capability, a traffic shaping capability, and an ability to be programmed to have a particular capability or capabilities.

In accordance with the method shown in FIG. 11 and discussed above, the node is an edge node of a mobile core domain of a wireless communications system and can be comprised of one of a signaling gateway (S-GW) coupled with a radio access network or a packet data gateway (P-GW) coupled with at least one packet data network.

In accordance with the method shown in FIG. 11 and discussed above, the step of virtualizing can instantiate at least one of an application part of the S-GW and an application part of the P-GW on a virtual machine in a cloud environment. In this embodiment at least one signaling functionality of the mobile core domain, such as the MME, can also be instantiated in the same or in a different cloud environment.

The embodiments of this invention also pertain to a non-transitory computer-readable medium that contains software program instructions, where execution of the software program instructions by at least one data processor results in performance of operations that comprise execution of the method shown in FIG. 11 and discussed above.

The various blocks shown in FIG. 11 may be viewed as method steps, and/or as operations that result from operation of computer program code, and/or as a plurality of coupled logic circuit elements constructed to carry out the associated function(s).

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, and referring to the above-mentioned PPPoE embodiment, the examples of the embodiments of this invention can also be employed to advantage in a fixed-mobile convergence (FMC) network type of deployment where one operator has both a fixed network and a mobile network. In this exemplary deployment scenario the operator could deploy the NEs 10 plus relevant applications and software to configure and instantiate a broadband remote access server (BRAS) or a S-GW, or both simultaneously as needed, by using and re-using (configuring and re-configuring) one or more of the NEs 10.

Further by example, while the exemplary embodiments have been described above at least partially in the context of the LTE system it should be appreciated that the exemplary embodiments of this invention are not limited for use with only this one particular type of wireless communication system, and that they may be used to advantage in other wireless communication systems, such as in WLAN or in GSM systems as two non-limiting examples.

It should be noted that the terms "connected", "coupled", or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, the various names used for the described network node, elements and functionalities (e.g., S-GW, P-GW, MME, HSS, eNB, etc.) are not intended to be limiting in any respect, as these various network node, elements and functionalities could be identified by any suitable names.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method, comprising:
decomposing functionalities of an edge node of a wireless communications system into a plurality of partitions comprised of:
at least one application part for executing at least gateway signaling plane functions and that interfaces logically to other signaling entities;
at least one control part for executing at least transport functions, wherein one of the transport functions comprises steering transport resources; and
at least one network element part for executing at least tunnel handling functions, wherein one of the tunnel handling functions comprises forwarding data;
virtualizing the at least one application part;
configuring the at least one network element to perform at least one tunnel handling function; and
instantiating the control part as at least one software-defined networking (SDN) controller, and where the at least one network element is comprised of a plurality of SDN controller configurable ports to receive data and to send data,
wherein the at least one application part, the at least one control part, and the at least one network element part are all located within the edge node, and
wherein the SDN controller is coupled with a network element capabilities database, the method further comprising sending a capabilities enquiry to one or more network elements, receiving a capabilities response from the one or more network elements, and storing network element capabilities information in the capabilities database.

2. The method as in claim 1, where configuring is performed in response to a request made to said at least one control part by said at least one application part.

3. The method as in claim 1, where virtualizing instantiates said at least one application part on a virtual machine in a cloud environment.

4. The method as in claim 1, where the at least one network element is further configured to receive data from a tunnel at a first port, to terminate the tunnel, and to send data that was encapsulated in the tunnel from a second port.

5. The method as in claim 1, where the at least one network element is further configured to receive data at a first port, to encapsulate the data in accordance with predetermined tunnel parameters, and to send the encapsulated data as tunneled data from a second port.

6. The method as in claim 1, where the at least one network element is further configured to perform traffic shaping for data received at a first port in accordance with predetermined traffic shaping parameters, and to send the traffic shaped data from a second port.

7. The method as in claim 1, where the at least one network element is further configured to perform encryption of data received at a first port in accordance with predetermined encryption parameters, and to send the encrypted data from a second port.

8. The method as in claim 1, where the at least one network element is further configured to perform decryption of encrypted data received at a first port in accordance with predetermined decryption parameters, and to send the decrypted data from a second port.

9. The method as in claim 1, where the at least one network element is further configured to store executable code defining processing rules, to perform processing of data received at a first port in accordance with the processing rules, and to send the processed data from a second port.

10. The method as in claim 1, where the at least one network element is further configured to receive data at a first port, to examine the received data, and to route the data to either a second port or a third port based on information stored in a flow table.

11. The method as in claim 1, where the network element is comprised of n ports and where the SDN controller is constrained to use m ports, where m<n.

12. The method as in claim 11, where the SDN controller is a first SDN controller coupled with a first virtualized application, and where a second SDN controller that is coupled with a second virtualized application uses at least one port not used by the first SDN controller.

13. The method as in claim 1, where a capabilities response received from a particular network element indicates that the network element has at least one or more of a routing capability, a tunnel handling capability, an encryption/decryption capability, a traffic shaping capability, and an ability to be programmed to have a particular capability or capabilities.

14. An apparatus, comprising:
at least one processor; and
at least one memory including computer program code, where the at least one memory and computer program code are configured to, with the at least one processor, cause the apparatus at least to:
decompose functionalities of an edge node of a wireless communications system into a plurality of partitions comprised of:
at least one application part for executing at least gateway signaling plane functions and that interfaces logically to other signaling entities;
at least one control part for executing at least transport functions, wherein one of the transport functions comprises steering transport resources; and
at least one network element part for executing at least tunnel handling functions, wherein one of the tunnel handling functions comprises forwarding data;
virtualize the at least one application part;
configure the at least one network element to perform at least one tunnel handling function; and
instantiate the control part as at least one software-defined networking (SDN) controller, and where the at least one network element is comprised of a plurality of SDN controller configurable ports to receive data and to send data,
wherein the at least one application part, the at least one control part, and the at least one network element part are all located within the edge node, and
wherein the SDN controller is coupled with a network element capabilities database, the apparatus further caused to send a capabilities enquiry to one or more network elements, receive a capabilities response from the one or more network elements, and store network element capabilities information in the capabilities database.

15. The apparatus as in claim 14, where the at least one network element is further configured to receive data from a tunnel at a first port, to terminate the tunnel and to send data that was encapsulated in the tunnel from a second port.

16. The apparatus as in claim 14, where the at least one network element is further configured to receive data at a first port, to encapsulate the data in accordance with predetermined tunnel parameters, and to send the encapsulated data as tunneled data from a second port.

17. A network element included in an edge node that executes at least tunnel handling functions, comprising:
a flow table;
a first interface for coupling with at least one software defined networking (SDN) controller; and
a second interface comprising a plurality of ports configurable by the at least one SDN controller while observing constraints imposed by said flow table,
wherein said network element included in the edge node being preconfigured or configurable to operate on data that is received at a first port, to process the received data in a manner that modifies the received data, and to send processed data from a second port,
wherein the network element is one of a plurality of partitions decomposed from the edge node,
wherein the SDN controller is coupled with a network element capabilities database, and
wherein the network element is configured to receive a capabilities enquiry, and send a capabilities response in response to the capabilities enquiry.

18. The apparatus as in claim 14, where virtualizing instantiates said at least one application part on a virtual machine in a cloud environment.

* * * * *